United States Patent
Liu et al.

(10) Patent No.: US 11,900,231 B2
(45) Date of Patent: Feb. 13, 2024

(54) HIERARCHY OPTIMIZATION METHOD FOR MACHINE LEARNING

(71) Applicant: PAYPAL, INC., San Jose, CA (US)

(72) Inventors: Lichao Liu, Sunnyvale, CA (US); Xuyao Hao, San Jose, CA (US); Zhanghao Hu, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 925 days.

(21) Appl. No.: 16/731,854

(22) Filed: Dec. 31, 2019

(65) Prior Publication Data

US 2021/0201207 A1     Jul. 1, 2021

(51) Int. Cl.
*G06N 20/20* (2019.01)
*G06N 3/08* (2023.01)
*G06N 3/045* (2023.01)

(52) U.S. Cl.
CPC .............. *G06N 20/20* (2019.01); *G06N 3/045* (2023.01); *G06N 3/08* (2013.01)

(58) Field of Classification Search
CPC ........ G06N 20/20; G06N 3/0454; G06N 3/08; G06N 5/003; G06N 20/00
See application file for complete search history.

(56) References Cited

U.S. PATENT DOCUMENTS

| | | |
|---|---|---|
| 2016/0110657 A1 | 4/2016 | Gibiansky et al. |
| 2017/0124487 A1 | 5/2017 | Szeto et al. |
| 2020/0057944 A1* | 2/2020 | Loh .................... G06N 5/01 |

FOREIGN PATENT DOCUMENTS

CN     106663224 A     5/2017

OTHER PUBLICATIONS

Bergstra, James, et al. "Hyperopt: a python library for model selection and hyperparameter optimization." Computational Science & Discovery 8.1 (2015): 014008. (Year: 2015).*
Akiba, Takuya, et al. "Optuna: a next-generation hyperparameter optimization framework." Proceedings of the 25th ACM SIGKDD international conference on knowledge discovery & data mining. 2019. (Year: 2019).*

(Continued)

*Primary Examiner* — Michael J Huntley
*Assistant Examiner* — Sehwan Kim
(74) *Attorney, Agent, or Firm* — Haynes and Boone, LLP

(57) ABSTRACT

A method includes receiving a set of training data and selecting a first machine learning platform based on a first optimization function that metrics past machine learning platforms used for training on the set of training data. The method also includes selecting a first algorithm supported by the first machine learning platform based on a second optimization function that metrics past algorithms used for training on the set of training data. Further, the method includes determining one or more hyperparameters supported by the first algorithm based on a third optimization function that metrics past combinations of hyperparameters from the set of hyperparameters used for training on the set of training data. The method also includes training a machine learning model on the set of training data using the first machine learning platform, the first algorithm, and the one or more hyperparameters.

20 Claims, 6 Drawing Sheets

(56) References Cited

OTHER PUBLICATIONS

Komer, Brent, James Bergstra, and Chris Eliasmith. "Hyperopt-sklearn: automatic hyperparameter configuration for scikit-learn." ICML workshop on AutoML. vol. 9. Austin, TX: Citeseer, 2014. (Year: 2014).*

Nguyen, Giang, et al. "Machine learning and deep learning frameworks and libraries for large-scale data mining: a survey." Artificial Intelligence Review 52.1 (2019): 77-124. (Year: 2019).*

Tu, Ke, et al. "Autone: Hyperparameter optimization for massive network embedding." Proceedings of the 25th ACM SIGKDD International Conference on Knowledge Discovery & Data Mining. 2019. (Year: 2019).*

Zhang, Chaoyun, Paul Patras, and Hamed Haddadi. "Deep learning in mobile and wireless networking: a survey." IEEE Communications surveys & tutorials 21.3 (2019): 2224-2287. (Year: 2019).*

Liashchynskyi, Petro, and Pavlo Liashchynskyi. "Grid search, random search, genetic algorithm: a big comparison for NAS." arXiv preprint arXiv:1912.06059 (2019). (Year: 2019).*

\* cited by examiner

HIERARCHY OPTIMIZATION METHOD FOR MACHINE LEARNING

BACKGROUND

Technical Field

This disclosure relates generally to machine learning and, more specifically, to a hierarchy optimization method for machine learning.

Description of the Related Art

Machine learning models are becoming a prevalent way for computer systems to make predictions, classify data, and/or make other determinations. In typical systems, a machine learning model is trained by a set of training data using various data processing and feature selection techniques. Further, various machine learning platforms are available that support different machine learning algorithms and/or have different implementations of the same machine learning algorithms. These machine learning algorithms in turn support different hyperparameters. Choosing the most effective combination of data processing techniques, feature selection techniques, machine learning platforms, machine learning algorithms, and/or hyperparameters to build a model for a given dataset may require a significant level of expertise and understanding about the nature of the dataset and the desired insights into the dataset.

Figure 1:
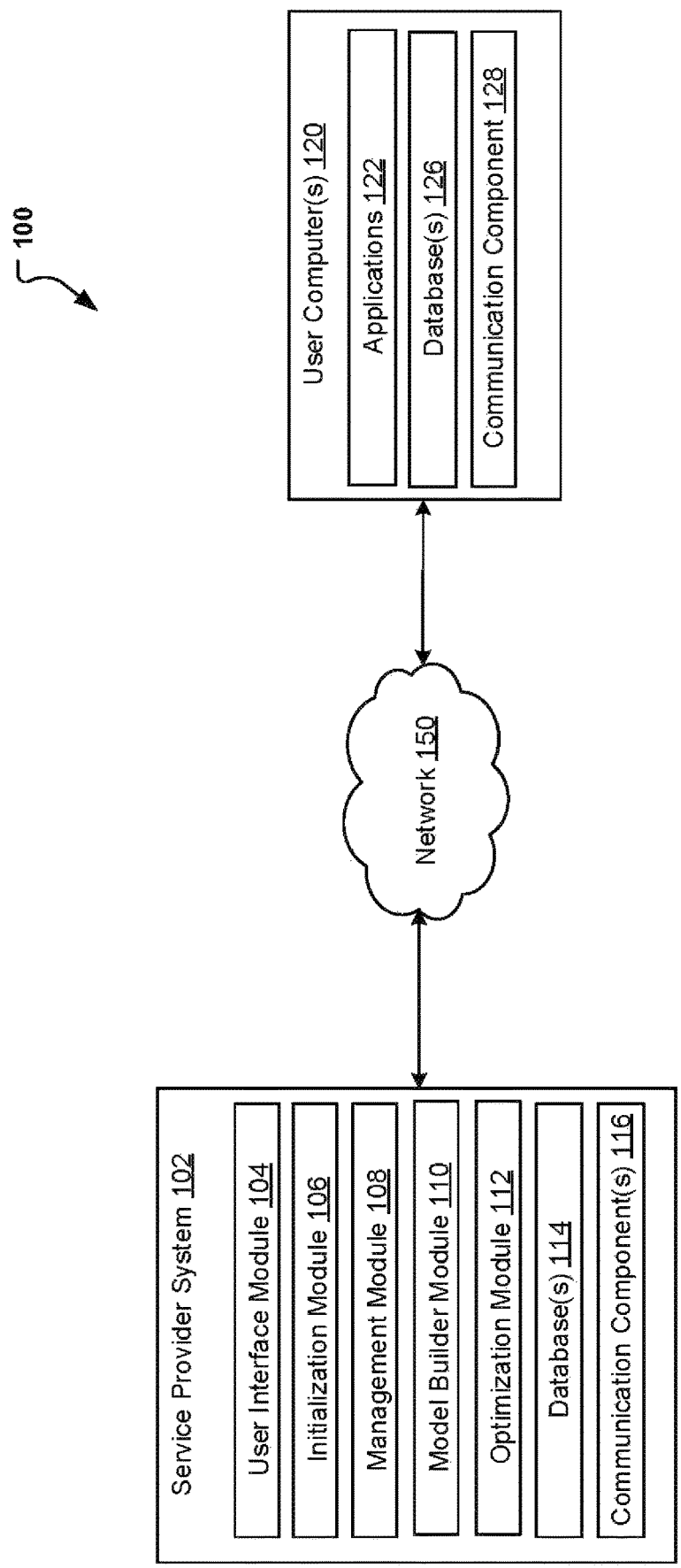
FIG. 1 is a block diagram illustrating an example system for a hierarchy optimization method for machine learning, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "account selection module" "configured to select and/or identify one or more accounts" is intended to cover, for example, a device that performs this function during operation, even if the corresponding device is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "processing element" refers to various elements configured to execute program instructions (or portions thereof or combinations thereof). Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

DETAILED DESCRIPTION

Techniques are disclosed for a hierarchy optimization method for machine learning. A service provider system maintained by a service provider is configured to receive a set of training data and to automatically determine a suitable machine learning model to be trained on the training data. As such, the service provider system may perform an iterative model selection process of selecting different machine learning models until a final machine learning model having a model performance metric that satisfies a performance threshold is selected.

The service provider system may provide a user interface, to designate certain parameters for training a machine learning model. For example, a data scientist may specify certain inputs via the user interface, such as the set of training data, evaluation dataset, data processing parameters, feature selection parameters, model structure parameters and performance metrics that data scientist wishes to optimize.

After the initial parameters have been input, the service provider system may initialize the iterative model selection process. The service provider system may have access to a set of data processing packages, a set of feature selection packages, and a set of machine learning platforms. Each of the machine learning platforms may support respective sets of machine learning algorithms. Each respective machine learning algorithm may support different sets of hyperparameters. According to a particular embodiment, the service provider system initializes the iterative model selection process by training a randomized selection of one or more machine learning models using the training data. As used herein, a selection of a machine learning model also includes one or more selections of corresponding data processing packages, feature selection packages, machine learning platforms, machine learning algorithms, and/or hyperparameters (e.g., which in this example, are randomly selected).

The service provider system may calculate a model performance metric for each of the trained randomly selected machine learning models. The service provider system stores associations between trained machine learning models and their respective model performance metrics. The number of randomly selected machine models that are trained by the service provider system may be predetermined and/or may be set as an input by the data scientist via the user interface.

After the randomly selected machine learning models are successively trained and their respective model performance metrics are recorded, the service provider system may be configured to select the next machine learning model to train. Again, this includes selecting the next combination of data processing package(s), feature selection package(s), a machine learning platform, a machine learning algorithm, and hyperparameters. The service provider system selects the next combination based on the performance of the previously trained machine learning models on the set of training data.

According to certain embodiments, the selection of the next machine learning model to train is performed according to a selection hierarchy. The selection hierarchy may include a first optimization layer that corresponds to selection of the data processing package(s), the feature selection package(s), and the machine learning platform. The service provider system may select a data processing package, a feature selection package, and a machine learning platform based on a first optimization function. The first optimization function receives a combination of a data processing package, feature selection package, and machine learning platform as input and outputs a optimization metric. As such, the service provider system may execute the optimization function using different combinations of data processing packages, feature selection packages, and machine learning platforms that have been previously used in training previous machine learning models with respect to the set of training data. The service provider system is configured to select the combination that is associated with the greatest optimization metric output by the first optimization function.

Based on the selection of a machine learning platform corresponding to the first optimization layer, the service provider system may determine a set of machine learning algorithms supported by the machine learning platform. The set of machine learning algorithms may correspond to a second optimization layer of the selection hierarchy. As such, the service provider system selects a machine learning algorithm from the set of machine learning algorithms based on a second optimization function. The inputs to the second optimization function are the respective machine learning algorithms from the set of machine learning algorithms supported by the selected machine learning platform. The second optimization function outputs respective optimization metrics associated each of the machine learning algorithms based on the performance of previous training iterations that used the machine learning algorithms to train models with respect to the set of training data. The service provider system is configured to select the machine learning algorithm associated with greatest optimization metric output by the second optimization function.

Based on the selection of the machine learning algorithm having the greatest performance metric output by the second optimization function, the service provider system may determine a set of hyperparameters supported by the machine learning algorithm. The set of hyperparameters may correspond to a third optimization layer of the selection hierarchy. To this end, the service provider system selects one or more hyperparameters from the set of hyperparameters based on a third optimization function. For example, the inputs to the third optimization function are the set of hyperparameters supported by the selected machine learning algorithm. The third optimization function outputs respective optimization metrics associated with each hyperparameter based on the performance of previous training iterations that used the hyperparameters to train models with respect to the set of training data. The service provider system is configured to select the hyperparameters having optimization metrics that satisfy a particular threshold. It will be understood that the service provider system also indicates particular values that should be used for the selected hyperparameters.

According to certain embodiments, the first optimization function, the second optimization function, and the third optimization function may be area under curve calculations though with different inputs. After the system provider system performs the respective selections corresponding to each optimization layer of the selection hierarchy, the service provider system trains the next machine learning model according to the selections. For example, training the next machine learning model means the service provider system may train the selected machine learning algorithm using the framework provided by the selected machine learning platform. Further, the selected machine learning algorithm may be trained using the selected hyperparameters (and their selected values).

Upon training the next machine learning model, the service provider system may calculate a model performance metric associated with the machine learning model. The model performance metric may reflect an area under curve calculation, a mean square error calculation, and/or any other type of performance metric appropriate to the selected machine learning algorithm. The service provider system records to model performance metric for the next machine learning model and determines whether the model performance metric satisfies the performance threshold. If performance threshold is not satisfied, the service provider system is configured to perform another iteration of the iterative model selection process. Otherwise, the service provider system determines that next machine learning model as the final machine learning model.

FIG. 1 is a block diagram illustrating an example system 100 for a hierarchy optimization method for machine learning. In the illustrated embodiment, the system 100 includes a service provider system 102, maintained by a service provider, in communication with other computer(s) 120 via a network 150. It will be appreciated that the service provider system 102 may include one or more computers, servers, and/or other devices, and that the modules included in the service provider system 102 may be executed by any combination of those devices.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

In FIG. 1, service provider system 102 may include a user interface module 104, an initialization module 106, a management module 108, a model builder module 110, an optimization module 112, database(s) 114, and communication components 116. Each of the components of the service provider system 102 may communicate with each other to implement the system for reducing transaction failure, as will be described in more detail below.

In general, the service provider system 102 may be configured to perform an iterative model selection process of training various machine learning models with respect to a set of training data using different parameters. The goal of the iterative model selection process may be to determine a final machine learning model that satisfies a performance threshold. Thus, the iterative model selection process may correspond to a form of reinforcement learning method for generating a machine learning model. As such, the final machine learning model may be generated by the service provider system 102 with relatively minimal input by a user, thereby abstracting out some of the complexity typically involved in building an effective machine learning model.

According to a particular embodiment, the user interface module 104 is configured to provide a user interface to a user (e.g., a data scientist) that enables the user to input various parameters for initializing the iterative model selection process. For example, the set of training data to be used to train the various models in the iterative model selection process maybe input via the user interface module 104. Other parameters may also be input via the user interface module 104, such as the number of iterations to be performed, learning rate, data processing method, the number of features to select, the feature selection methods, model structures and etc.

The service provider system 102 may have access to a set of data processing packages, a set of feature selection packages, and a set of machine learning platforms. The data processing packages may include one or more libraries, code, and/or other software components that implement different data processing techniques. Generally, data processing may process and transform raw data (e.g., the set of training data in this context) into a form that is compatible with a machine learning algorithm. The set of data processing packages may include, but are not limited to, packages that implement Z-scale transformation, categorial variable binning, two variable multiplication, and/or the like.

The feature selection packages may include one or more libraries, code, and/or other software components that implement different feature selection techniques. Feature selection may a process by which a subset of relevant features (e.g., measurable properties of a dataset) are selected for model construction. As such, the set of feature selection packages may include, but are not limited to, packages that implement information value variable selection, correlation-based feature selection, feature importance, T-test, and/or the like.

The set of machine learning platforms may include various libraries, tools, toolkits, operating systems, and/or other software components by which computer programs for implementing machine learning algorithms may be executed. As such, different machine learning platforms can support different machine learning algorithms. Further, different machine learning platforms can support the same machine learning algorithm but implement the machine learning algorithms differently, thereby producing different training results from the same set of training data. The machine learning algorithms may include, but are not limited to, neural networks, recurrent neural networks, gradient boosted trees, logistic regression, random forest, and/or the like.

In addition, different machine learning algorithms may support different sets of hyperparameters. Hyperparameters may be variables used to tune different learning aspects of a machine learning model and which may be set before training begins. Hyperparameters may include, but are not limited to, a learning rate, an activation function, a number of iterations, a number of hidden nodes, a number of hidden layers, a number of trees, a dropout rate, a maximum tree depth, and/or the like.

The initialization module 106 is configured to initialize the iterative model selection process based on the parameters input via the user interface module 104. According to a particular embodiment, the initialization module 106 randomly selects a machine learning model (i.e., randomly selects a data processing package, a feature selection package, a machine learning platform, a machine learning algorithm, and one or more hyperparameter values) to train to begin the iterative model selection process. The randomly selected machine learning model may be executed (e.g., by the model builder module 110), and a model performance metric may be calculated. An association between the randomly selected machine learning model and its model performance metric may be recorded/stored, such as in a database 114 and/or any other storage.

The initialization module 106 continues to randomly select machine learning models and to calculate and store their respective model performance metrics until a desired number of randomly selected machine learning models have been trained. The desired number may be predetermined (e.g., set as an input parameter via the user interface module 104) or maybe determined dynamically as the models are trained (e.g., such as based one or more of their respective model performance metrics).

The management module 108 may be configured to facilitate the operations and communications between the various modules of the service provider system 102 while running the iterative model selection process. For instance, the management module 108 may facilitate communication between the initialization module 106 and the model builder module 110 during the initialization phase. The randomly selected models by the initialization module 106 are indicated to the management module 108. The management module 108 may retrieve the appropriate components associated with the randomly selected model (e.g., data processing packages, feature selection packages, etc.) and provide them to the model builder module 110. The model builder module 110 trains the randomly selected model with respect to the set of training data using the provided components. As previously discussed, the model builder module 110 further determines a model performance metric based in the training. The management module 108 stores an association between the randomly selected model and its model performance metric.

Subsequent to the initialization phase, the management module 108 may facilitate the operations of the optimization module 112 and the model builder module 110. For instance, the optimization module 112 may select the next machine learning model to train based on one or more respective performance metrics corresponding to the randomly selected machine learning models (and their components) that were previously trained during the initialization phase.

Figure 3:
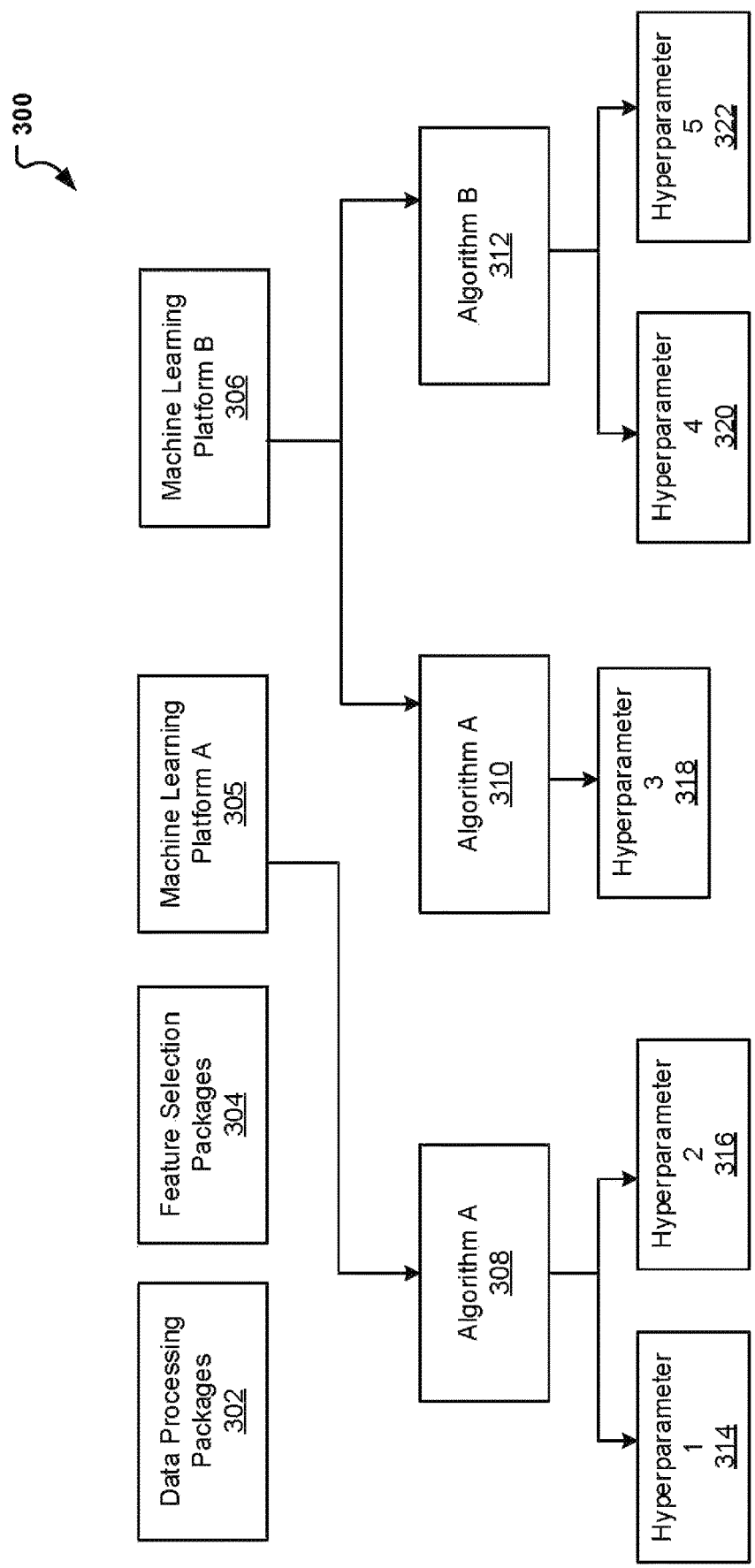
FIG. 3 is a diagram illustrating an selection hierarchy, according to some embodiments.

According to a particular embodiment, the optimization module 112 may select the next machine learning model to train by using a selection hierarchy. FIG. 3 illustrates an example selection hierarchy 300 that may be used by the optimization module 112. As illustrated in FIG. 3, a set of data processing packages 320, a set of features selection packages 304, machine learning platform A 305, and machine learning platform B 306 may correspond to a first optimization layer of the selection hierarchy. Algorithm A 308, algorithm A 310, and algorithm B 312 correspond to a second optimization layer of the selection hierarchy 300. Machine platform A 305 supports algorithm A 308, and machine platform B 306 supports algorithm A 310 and algorithm B 312. Finally, hyperparameters 1-5 correspond to a third optimization layer of the selection hierarchy 300. It will be appreciated that while FIG. 3 illustrates a particular hierarchy framework, any number of model platforms supporting any number of machine learning algorithms and hyperparameters in any combination are possible.

Based on the selection hierarchy 300, the optimization module 112 first makes selection corresponding to the first optimization layer. That is, the optimization module 112 selects a data processing package from the set of data processing packages 302, a feature selection package from the set of features selection packages 304, and a machine learning platform. The optimization module 112 makes this selection based on a first optimization function corresponding to the first optimization layer. The first optimization function may determine, based on the particular data processing packages, feature selection packages, and machine learning platforms that were selected in previous iterations of the iterative model selection process, which data processing package, feature selection package and machine learning platform to select in the next iteration. For instance, the first optimization function may be executed using different combinations of the data processing packages, feature selection packages, and machine learning platforms that were selected in previous iterations. First optimization function outputs a respective optimization metric for each of the combinations, and the optimization module 112 selects the combination having the highest optimization metric.

Based on the machine learning platform selected by the optimization module 112 with respect to the first optimization layer of the selection hierarchy 300, the optimization module 112 next selects a machine learning algorithm supported by the selected machine learning platform. For example, if the optimization module 112 selected machine learning platform B 306, the optimization module 112 selects the next machine learning algorithm from among algorithm A 310 and algorithm B 312. Algorithm A 308 is not considered since the optimization module 112 did not select machine learning platform A.

The optimization module 112 selects the next machine learning algorithm in the second optimization layer according to a second optimization function. The second optimization function may determine, based on the particular machine learning algorithms that were selected in previous iterations of the iterative model selection process, which of the machine learning algorithms to use for the next iteration. For instance, the second optimization function outputs a respective optimization metric for each of the supported machine learning algorithms (e.g., algorithm A 310 and algorithm B 312), and the optimization module 112 selects the algorithm having the greatest optimization metric.

Based on the machine learning algorithm selected by the optimization module 1112 with respect to the second optimization layer, the optimization module 112 selects the next hyperparameters (and their values) that are supported by the selected machine learning algorithm. For example, if the optimization module 112 selected algorithm B 312, the optimization module 112 selects the next hyperparameters from among hyperparameter 4 320 and hyperparameter 5 322.

The optimization module 112 may select the next hyperparameters in the third optimization layer according to a third optimization function. The third optimization function may determine, based on the particular hyperparameters that were selected in previous iterations of the iterative model selection process, which of the hyperparameters to use for the next iteration. For instance, the third optimization function outputs a respective optimization metric for each combination of the supported hyperparameters and their respective values, and the optimization module 112 selects the hyperparameters having the optimization metrics that satisfy a metric threshold.

According to certain embodiments, the first optimization function, the second optimization function, and the third optimization function are pre-defined optimization functions that are used to optimize certain metrics such as area under curve, model precision and/or the like. The optimization functions may be standard optimization functions and/or may be function defined by the user/data scientist.

The optimization module 112 selects the next machine learning model to train (e.g., selects the next data processing package, feature selection package, machine learning platform, machine learning algorithm, and hyperparameters), and indicates the selected model to the management module 108. The management module 108 may be configured to retrieve the indicate model and its components from a storage, such as a database 114, and provide the components to the model builder module 110. The model builder module 110 trains the selected model (i.e., trains the selected machine learning algorithm using the selected machine learning platform with the selected data processing packet, feature selectin package, and hyperparameters) with respect to the set of training data. Subsequent to the training, the model builder module 110 calculates a model performance metric for the selected machine learning model.

The management module 108 compares the model performance metric with a performance threshold. If the model performance threshold is satisfied, the management module 108 outputs the trained machined learning model as a final machine learning model that is to be used in a production computing environment. The iterative model selection process is then completed. Otherwise, if the performance threshold is not satisfied, the management module 108 records an association between the trained machine learning model and its model performance metric and instructs the optimization module 112 to select another machine learning model to train, thereby continuing the iterative model selection process.

The database(s) 114 stores various information that may include, for example, identifiers (IDs) such as operating system registry entries, cookies, IDs associated with hardware of the communication component 116, IDs used for payment/user/device authentication or identification, card IDs and transaction information associated with the card IDs, and/or other appropriate IDs. Further, the database 114 may store login credentials (e.g., such as to login to an account with the service provider and/or other accounts with other service providers), identification information, biometric information, and/or authentication information of the user the applications 122 connect to the service provider system 102 to access. The database 114 may also store the review queue 106 in some embodiments.

The communication component 116 may be configured to communicate with various other devices, such as the user computer(s) 120 and/or other devices. In various embodiments, communication component 14 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

FIG. 1 further illustrates the user computer(s) 120, each of which includes applications 122, database 126, and communication component 128. As previously discussed, the applications 122 may be any type of application that access the service provider system 102. According to a particular embodiment, the applications are user applications for a payment service provider that communicates with the service provider system 102 to build and train models. As such, the user may be a data scientist that uses the user computer 120 to interface was the user interface module 104 of the service provider system 102.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

Figure 2:
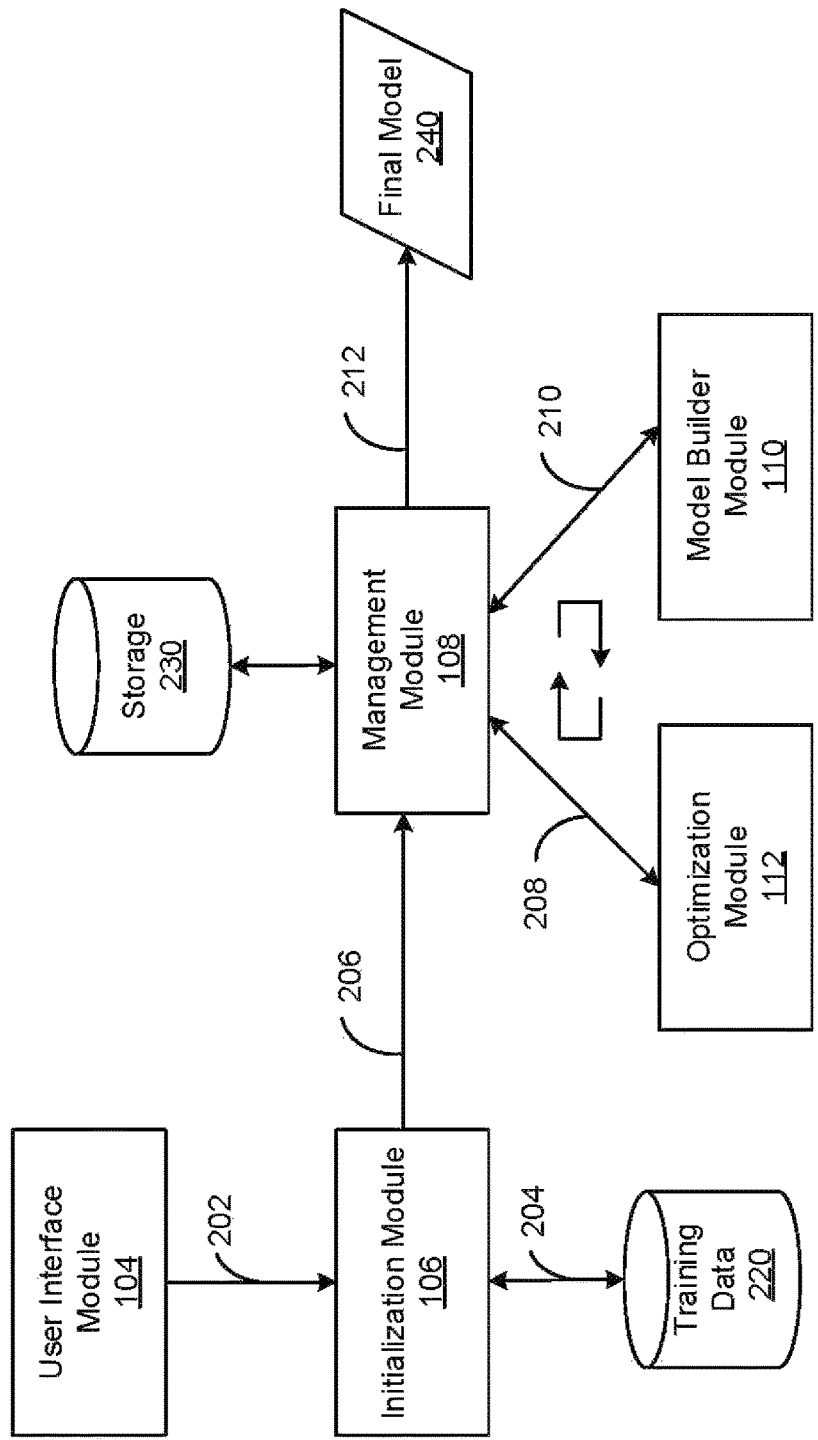
FIG. 2 is a diagram illustrating a data flow for a system for a hierarchy optimization method for machine learning, according to some embodiments.

FIG. 2 illustrates a data flow diagram 200 for a hierarchy optimization method for machine learning, in accordance with a particular embodiment. As shown in FIG. 2, the one or more initialization parameters may be input via the user interface module 104 at step 202. At step 204, the initialization module 106 may access and/or load a set of training data 220. The set of training data may be stored in the database 114 although any type of storage device can be used. In certain implementations, the location of the training data 220 is specified via the input parameters input via the user interface module 104.

At step 206, the initialization module may instruct the management module 108 to initiate an iterative model selection process. According to a particular embodiment, the initialization module 106 randomly selects one or more machine learning models to train with respect to the set of training data 220. The randomly selected machine learning models are successively trained by the model builder module 110, and their respective model performance metrics are calculated and recorded.

At step 208, after the randomly selected models have been initialized and trained, the management module 108 may request the optimization module 112 to select the next machine learning model to train on the training data 220. The optimization module 112 selects the next machine learning model according to a selection hierarchy, such as the selection hierarchy depicted in FIG. 3. As previously discussed, the optimization module 112 selects a combination of a data processing package, a feature selection package, a machine learning platform, machine learning algorithm, and hyperparameters for the next machine learning model. The selections may be based on respective optimization metrics corresponding to each optimization layer of the selection hierarchy 300 with respect to previously trained machine learning models in the iterative model selection process.

The management module 108 may retrieve the selected components from storage 230 and provide the selected components to the model builder module 110 at step 210. The model builder module 110 is configured to train the next machine learning model using the selected components. The model builder module 110 further calculates a model performance metric corresponding to the newly trained model. The management module 110 further stores an association between the newly trained model and its corresponding model performance metric in a storage, such as database 114, storage 230, and/or any other storage device.

The management module 108 also compares the model performance metric with performance threshold. If the model performance metric satisfies the performance threshold, the management module outputs the newly trained model as the final model 240. The final model 240 can then be executed in a live production computing environment. If the model performance metric fails to satisfy the performance threshold, the management module 108 may instruct the optimization module 112 to select another machine learning model to train for another iteration of the iterative model selection process.

Thus, the system described herein provides a final machine learning model 240 given a relatively small amount of inputs. Specific expertise regarding the dataset (e.g., the set of training data 220) can be minimized, and the complexity of constructing a machine learning model can be abstracted to make model construction an easier and more efficient process.

Figure 4:
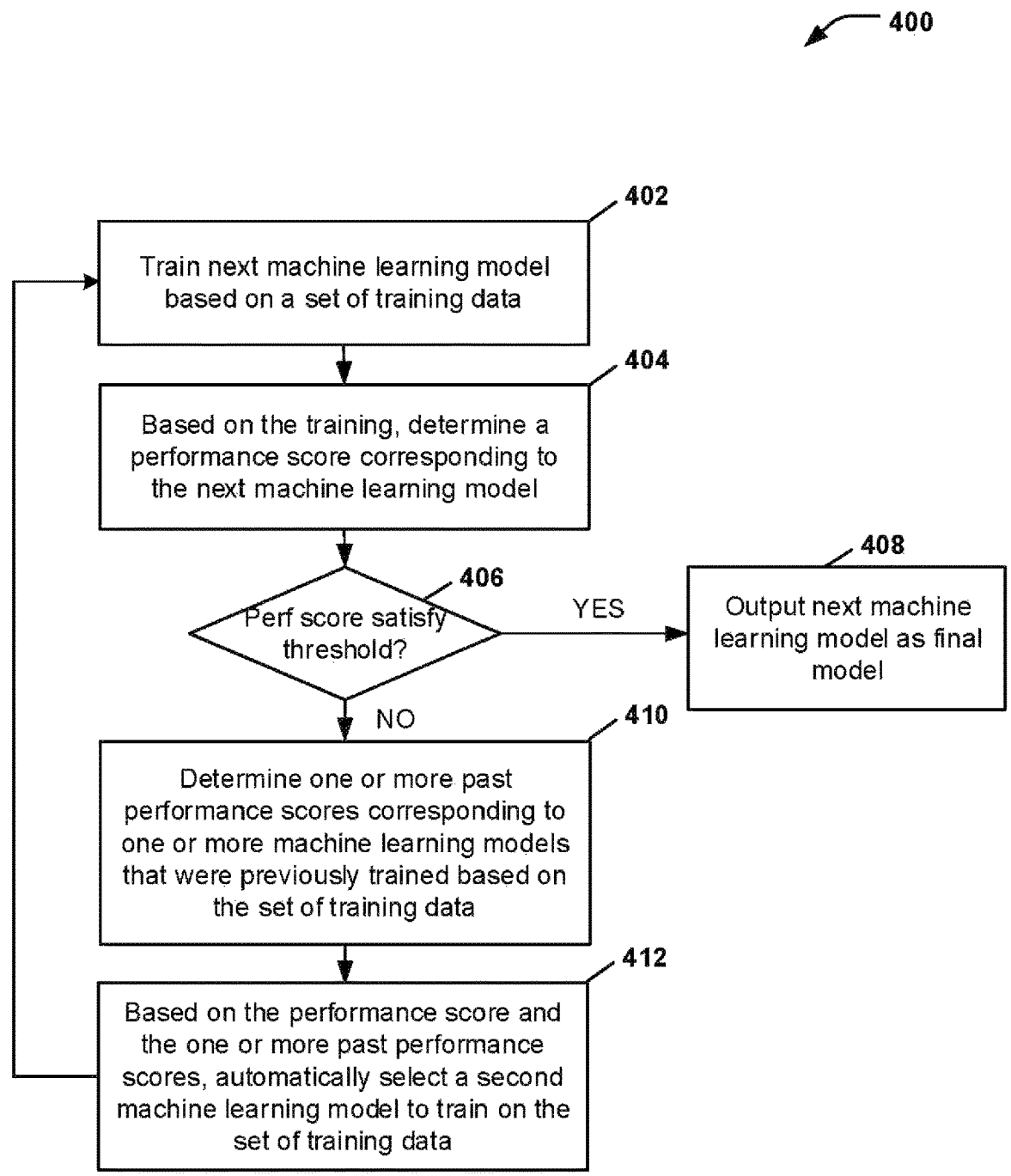
FIG. 4 illustrates a flow diagram that depicts a method for optimizing data processing and feature selection for model training, according to some embodiments.

FIG. 4 illustrates a flow diagram of a method 400 for optimizing data processing and feature selection for model training, in accordance with one or more particular embodiments. The method 400 may be performed by a service provider system, such as the service provider system 102. The method 400 beings at step 402, where the service provider system trains the next machine learning model based on a set of training data.

At step 404, based on training the next machine learning model, the service provider system determines a model performance metric corresponding to the next machine learning model. At step 406, the service provider system determines whether the model performance metric satisfies a performance threshold. If so, the method 400 proceeds to step 408, where the service provider system outputs the next machine learning model as a final machine learning model to be used in a production computing environment.

At step 410, if the service provider system determines that the model performance metric fails to satisfy the performance threshold, the service provider system determines one or more past performance metric corresponding to one or more machine learning models that were previously trained on the set of training data.

At step 412, based on the model performance metric and the one or more past performance metrics, the service provider system automatically selects a second machine learning model to train on the set of training data. Thereafter, the method 400 proceeds back to step 402.

Figure 5:
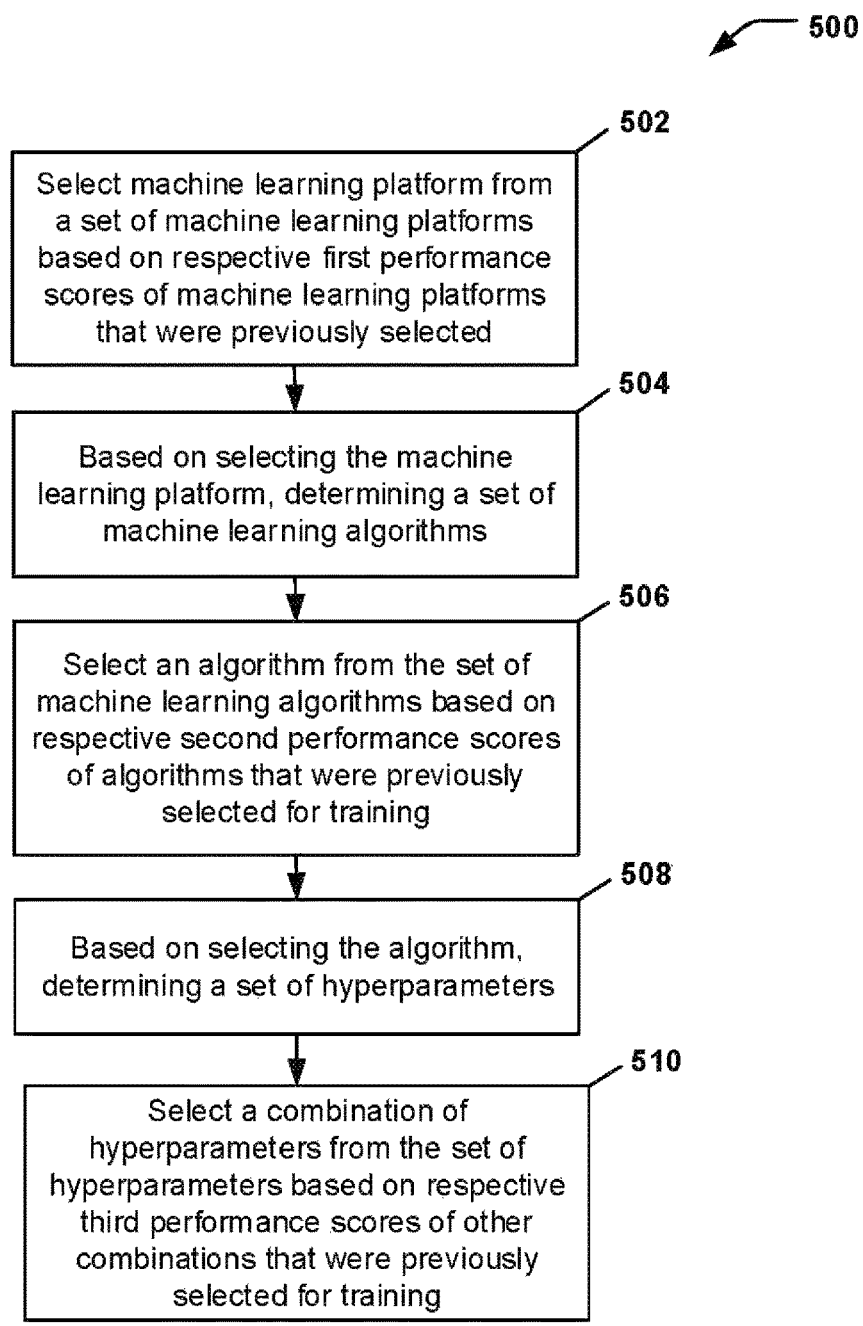
FIG. 5 illustrates a flow diagram that depicts a method for a hierarchy optimization method for machine learning, according to some embodiments.

FIG. 5 illustrates a flow diagram of a method 500 for a hierarchy optimization method for machine learning, in accordance with one or more particular embodiments. The method 500 may be performed by a service provider system, such as the service provider system 102. The method 500 beings at step 502, where the service provider system selects a machine learning platform from a set of machine learning platforms based on respective first performance metrics of machine learning platforms that were previously selected for training using a set of training data. For instance, the first performance metrics may correspond to metrics output by the first optimization function of the first optimization layer of the selection hierarchy 300.

At step 504, the service provider system may determine a set of machine learning algorithms based on selecting the machine learning platform. The set of machine learning algorithms may be supported by the selected machine learning platform. At step 506, the service provider system may select an algorithm from the set of machine learning algorithms based on respective second performance metrics of algorithms that were previously selected for training using the set of training data. For instance, the second performance metrics may correspond to metrics output by the second optimization function of the second optimization layer of the selection hierarchy 300.

At step 508, the service provider system may determine a set of hyperparameters based on the selected algorithm. In other words, the set of hyperparameters may be the hyperparameters supported by the selected algorithm. At step 510, the service provider system may select a combination of hyperparameters from the set of hyperparameters based on respective third performance metrics of other combinations of hyperparameters that were previously selected for training using the set of training data. For example, the third performance metrics may correspond to metrics output by the third optimization function of the third optimization layer of the selection hierarchy 300.

Example Computing Device

Figure 6:
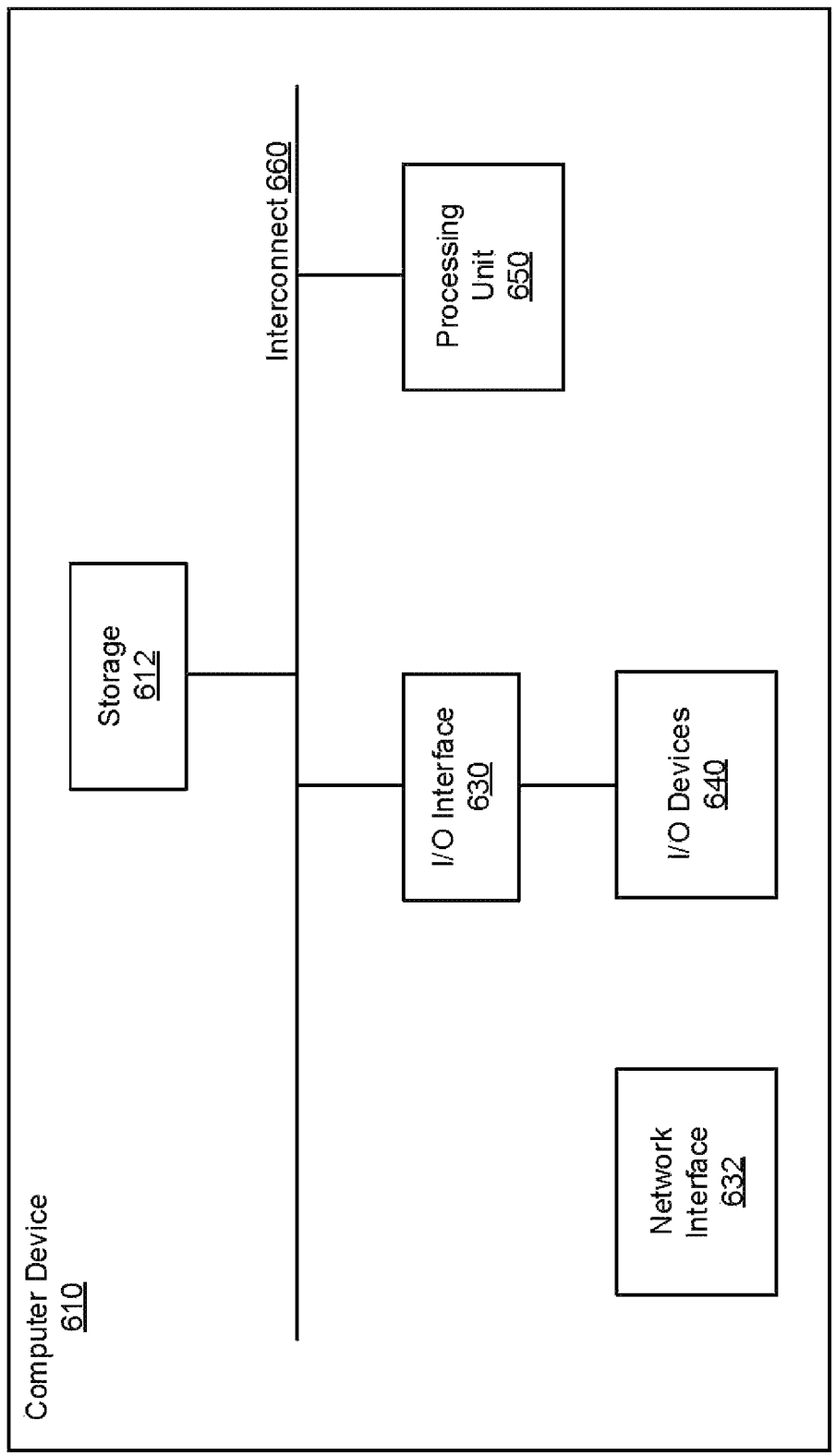
FIG. 6 is a block diagram illustrating an exemplary computing device, according to some embodiments.

Turning now to FIG. 6, a block diagram of one embodiment of computing device (which may also be referred to as a computing system) 610 is depicted. Computing device 610 may be used to implement various portions of this disclosure including any of the components illustrated in FIG. 1 and FIG. 2A-C. Computing device 610 may be any suitable type of device, including, but not limited to, a personal computer system, desktop computer, laptop or notebook computer, mainframe computer system, web server, workstation, or network computer. As shown, computing device 610 includes processing unit 650, storage 612, and input/output (I/O) interface 630 coupled via an interconnect 660 (e.g., a system bus). I/O interface 630 may be coupled to one or more I/O devices 640. Computing device 610 further includes network interface 632, which may be coupled to network 620 for communications with, for example, other computing devices.

In various embodiments, processing unit 650 includes one or more processors. In some embodiments, processing unit 650 includes one or more coprocessor units. In some embodiments, multiple instances of processing unit 650 may be coupled to interconnect 660. Processing unit 650 (or each processor within 650) may contain a cache or other form of on-board memory. In some embodiments, processing unit 650 may be implemented as a general-purpose processing unit, and in other embodiments it may be implemented as a special purpose processing unit (e.g., an ASIC). In general, computing device 610 is not limited to any particular type of processing unit or processor subsystem.

Storage subsystem 612 is usable by processing unit 650 (e.g., to store instructions executable by and data used by processing unit 650). Storage subsystem 612 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 612 may consist solely of volatile memory, in one embodiment. Storage subsystem 612 may store program instructions executable by computing device 610 using processing unit 650, including program instructions executable to cause computing device 610 to implement the various techniques disclosed herein.

I/O interface 630 may represent one or more interfaces and may be any of various types of interfaces configured to couple to and communicate with other devices, according to various embodiments. In one embodiment, I/O interface 630 is a bridge chip from a front-side to one or more back-side buses. I/O interface 630 may be coupled to one or more I/O devices 640 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. A system, comprising:
one or more hardware processors; and
at least one memory storing computer-executable instructions, that in response to execution by the one or more hardware processors, causes the system to perform operations comprising:
training a set of randomly selected machine learning models based on a set of training data and randomly selecting a set of machine learning algorithms for a set of machine learning platforms;
calculating a set of model performance metrics for the set of randomly selected machine learning models;
iteratively selecting a plurality of machine learning models to train on the set of training data, each iteration of the iteratively selecting comprising:
determining respective first performance metrics corresponding to the set of machine learning platforms from previous training iterations of the set of machine learning models using the set of training data,
selecting a first machine learning platform from the set of machine learning platforms using a first optimization function for the respective first performance metrics, wherein the first optimization function selects the first machine learning platform based on a greatest optimization metric;
determining a set of machine learning algorithms based on the first machine learning platform, wherein the set of machine learning algorithms comprise separate algorithms from the randomly selected set of machine learning algorithms,
selecting a first machine learning algorithm from the set of machine learning algorithms using a second optimization function for past performances of the set of machine learning algorithms from the previous training iterations,
determining a set of hyperparameters based on the first machine learning algorithm, and
selecting a first combination of hyperparameters from the set of hyperparameters using a third optimization function for previous uses of the hyperparameters from the previous training iterations and a hyperparameter value threshold; and
training, after training the set of randomly selected machine learning models, a new machine learning model based on the set of training data using the first machine learning platform, the first machine learning algorithm, and the first combination of hyperparameters;
calculating a new model performance metric of the new machine learning model;
comparing the calculated new model performance metric of the new machine learning model to a threshold metric for the calculated set of model performance metrics for the set of randomly selected machine learning models; and
determining whether to output the new machine learning model as a final machine learning model for a deployment in a production computing environment based on the comparing.

2. The system of claim 1, wherein the set of machine learning algorithms are supported by the first machine learning platform.

3. The system of claim 2, wherein a second machine learning platform of the set of machine learning platforms supports a second set of machine learning algorithms that is different than the set of machine learning algorithms supported by the first machine learning platform.

4. The system of claim 1, wherein the set of hyperparameters are supported by the first machine learning algorithm.

5. The system of claim 4, wherein a second machine learning algorithm of the set of machine learning algorithms supports a second set of hyperparameters that is different than the set of hyperparameters supported by the first machine learning algorithm.

6. The system of claim 1, wherein the set of machine learning algorithms comprise at least one of a neural network, a recurrent neural network, a gradient boosted tree, a logistic regression, or a random forest.

7. The system of claim 1, wherein the set of hyperparameters comprises at least one of a learning rate, an activation function, a number of iterations, number of trees, a maximum depth, a dropout rate, a number of hidden layers, or a number of hidden nodes.

8. The system of claim 1, wherein each iteration of the iteratively selecting further comprises:
selecting a data processing package from a set of data processing packages and a feature selection package from a set of feature selection packages.

9. The system of claim 1, wherein the determining whether to output the new machine learning model as the final machine learning model comprises:
selecting the new machine learning model as the final machine learning model when the new machine learning model has the new model performance metric for a performance of the new machine learning model that satisfies the threshold metric associated with the respective first performance metrics from the previous training iterations.

10. A method, comprising:
receiving, by a service provider system comprising one or more hardware processors, a set of training data;
training a set of randomly selected machine learning models based on a set of training data and randomly selecting a set of machine learning algorithms for a set of machine learning platforms;
calculating a set of model performance metrics for the set of randomly selected machine learning models;
iteratively selecting a plurality of machine learning models to train on the set of training data, each iteration of the iteratively selecting comprising:
selecting a first machine learning platform from the set of machine learning platforms based on a first optimization function that past machine learning platforms used for previous training iterations on the set of training data, wherein the first optimization function selects the first machine learning platform based on a greatest optimization metric of the set of model performance metrics from the previous training iterations on the set of training data;
selecting a first algorithm from a set of algorithms supported by the first machine learning platform based on a second optimization function that past algorithms used for the previous training iterations on the set of training data, wherein the first algorithm is separate from the randomly selected set of machine learning algorithms, and wherein the second optimization function uses past performances of the past algorithms from the previous training iterations on the set of training data for the selecting;

determining one or more hyperparameters from a set of hyperparameters supported by the first algorithm based on a third optimization function that past combinations of hyperparameters from the set of hyperparameters used for the previous training iterations on the set of training data, wherein the third optimization function uses previous uses of the set of hyperparameters during the previous training iterations on the set of training data and a hyperparameter value threshold for the determining;

training, after training the set of randomly selected machine learning models, a new machine learning model based on the set of training data using the first machine learning platform, the first algorithm, and the one or more hyperparameters;

calculating a new model performance metric of the new machine learning model;

comparing the calculated new model performance metric of the new machine learning model to a performance threshold metric for the calculated set of model performance metrics for the set of randomly selected machine learning models; and determining whether to output the new machine learning model as a final machine learning model for a deployment in a production computing environment based on the comparing.

11. The method of claim 10, wherein the determining whether the new machine learning model is the final machine learning model comprises determining whether the performance threshold metric has been satisfied by the new model performance metric based on the comparing.

12. The method of claim 11, wherein the determining whether the performance threshold metric has been satisfied comprises determining that the additional model performance metric satisfies the performance threshold metric, and wherein the operations further comprise:
outputting the new machine learning model as the final machine learning model.

13. The method of claim 11, wherein the determining whether the performance threshold metric has been satisfied comprises determining that the additional model performance metric fails to satisfy the performance threshold metric, and wherein the operations further comprise:
selecting a second machine learning platform, a second algorithm supported by the second machine learning platform, and one or more hyperparameters supported by the second algorithm to train a second machine learning model on the set of training data.

14. The method of claim 13, wherein the second machine learning platform supports a different set of algorithms than the first machine learning platform.

15. The method of claim 13, wherein the second algorithm is different than the first algorithm, and wherein the second algorithm supports a different set of hyperparameters than the first algorithm.

16. The method of claim 10, wherein the first algorithm is included in a set of algorithms supported by the first machine learning platform, the set of algorithms comprising at least one of a neural network, a recurrent neural network, a gradient boosted tree, a logistic regression, or a random forest.

17. The method of claim 10, wherein the one or more hyperparameters are included in a set of hyperparameters supported by the first algorithm, the set of hyperparameters comprising at least one of a learning rate, an activation function, a number of iterations, number of trees, a maximum depth, a dropout rate, a number of hidden layers, or a number of hidden nodes.

18. A non-transitory computer readable medium storing computer-executable instructions that in response to execution by one or more hardware processors, causes a system to perform operations comprising:

receiving a set of training data;

training a set of randomly selected machine learning models based on a set of training data and randomly selecting a set of machine learning algorithms for a set of machine learning platforms;

calculating a set of model performance metrics for the set of randomly selected machine learning models;

iteratively selecting a plurality of machine learning models to train on the set of training data, each iteration of the iteratively selecting comprising:
selecting a first machine learning platform from the set of machine learning platforms based on a first optimization function that past machine learning platforms used for previous training iterations on the set of training data, wherein the first optimization function selects based on a greatest optimization metric of the set of model performance metrics from the previous training iterations on the set of training data;

selecting a first algorithm from a set of algorithms supported by the first machine learning platform based on a second optimization function that past algorithms used for the previous training iterations on the set of training data, wherein the first algorithm is separate from the randomly selected set of machine learning algorithms, and wherein the second optimization function uses past performances of the past algorithms from the previous training iterations on the set of training data for the selecting;

determining one or more hyperparameters from a set of hyperparameters supported by the first algorithm based on a third optimization function that metrics past combinations of hyperparameters from the set of hyperparameters used for the previous training iterations on the set of training data, wherein the third optimization function uses previous uses of the set of hyperparameters during the previous training iterations on the set of training data and a hyperparameter value threshold for the determining;

training, after training the set of randomly selected machine learning models, a new machine learning model based on the set of training data using the first machine learning platform, the first algorithm, and the one or more hyperparameters;

calculating a new model performance metric of the new machine learning model;

comparing the calculated new model performance metric of the new machine learning model to a performance threshold metric for the calculated set of model performance metrics for the set of randomly selected machine learning models; and determining whether to output the new machine learning model as a final machine learning model for a deployment in a production computing environment based on the comparing.

19. The non-transitory computer readable medium of claim 18, wherein the operations further comprise:
calculating the performance threshold metric based on past performance metrics associated with the past machine learning platforms.

20. The non-transitory computer readable medium of claim 18, wherein the operations further comprise:
determining that the new model performance metric satisfies the performance threshold metric; and
outputting the machine learning model as the final machine learning model.

* * * * *